(12) United States Patent
Gutierrez et al.

(10) Patent No.: US 12,545,227 B2
(45) Date of Patent: Feb. 10, 2026

(54) BRAKE SERVICE MANAGEMENT SYSTEM

(71) Applicant: GM GLOBAL TECHNOLOGY OPERATIONS LLC, Detroit, MI (US)

(72) Inventors: Michael Andrew Gutierrez, Dearborn Heights, MI (US); Christopher M. Jones, Bruce Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 191 days.

(21) Appl. No.: 18/519,878

(22) Filed: Nov. 27, 2023

(65) Prior Publication Data

US 2025/0171007 A1    May 29, 2025

(51) Int. Cl.
*B60T 17/22*    (2006.01)
*B60T 13/74*    (2006.01)

(52) U.S. Cl.
CPC ............ *B60T 17/221* (2013.01); *B60T 13/74* (2013.01)

(58) Field of Classification Search
CPC ....... B60T 17/221; B60T 13/74; G06Q 10/20; G06Q 10/063
See application file for complete search history.

(56) References Cited

U.S. PATENT DOCUMENTS

| | | | | |
|---|---|---|---|---|
| 2014/0015657 A1* | 1/2014 | Hanson | ..................... | B60Q 1/26 340/431 |
| 2015/0360671 A1* | 12/2015 | Williams | .............. | B60T 17/221 701/70 |
| 2016/0076609 A1* | 3/2016 | Narula | .................. | F16D 55/226 188/73.33 |
| 2019/0100191 A1* | 4/2019 | Kikkawa | .............. | G07C 5/0808 |
| 2021/0197866 A1* | 7/2021 | Ikenori | ..................... | B60T 7/06 |
| 2022/0135016 A1* | 5/2022 | Bailey | .................. | B60T 13/662 701/29.2 |
| 2022/0281431 A1* | 9/2022 | Ritter | ...................... | F16D 65/14 |
| 2023/0228310 A1* | 7/2023 | Toy | ....................... | F16D 66/021 188/1.11 W |
| 2023/0265900 A1* | 8/2023 | Park | ..................... | F16D 66/022 188/1.11 L |
| 2024/0194000 A1* | 6/2024 | Conklin | ................ | B60W 50/14 |

* cited by examiner

*Primary Examiner* — Jelani A Smith
*Assistant Examiner* — Alyssa Rorie
(74) *Attorney, Agent, or Firm* — Ingrassia Fisher & Lorenz, LLP | IF&L

(57) ABSTRACT

In an exemplary embodiment, a system is provided that includes one or more sensors and a processor. The one or more sensors are configured to at least facilitate obtaining sensor data as to a vehicle. The processor is coupled to the one or more sensors, and is configured to at least facilitate receiving a request for service of a braking system of the vehicle; and upon receiving the request, automatically initiating the service of the braking system of the vehicle using the sensor data, in accordance with instructions provided by the processor.

20 Claims, 2 Drawing Sheets

BRAKE SERVICE MANAGEMENT SYSTEM

INTRODUCTION

The technical field generally relates to vehicles and, more specifically, to methods and systems for facilitating brake service for users of the vehicle.

Many vehicles today have braking systems that require service from time to time, such as replacement of brake pads and rotors. However, existing techniques may not always provide optimal or the most convenient opportunities for braking system servicing for a user of the vehicle.

Accordingly, it is desirable to provide improved methods and systems for providing brake servicing for a user of a vehicle. Furthermore, other desirable features and characteristics of the present disclosure will become apparent from the subsequent detailed description and the appended claims, taken in conjunction with the accompanying drawings and the foregoing technical field and background.

SUMMARY

In accordance with an exemplary embodiment, a method is provided that includes receiving a request for service of a braking system of a vehicle; and upon receiving the request, automatically initiating the service of the braking system of the vehicle, in accordance with instructions provided by a processor of the vehicle.

Also in an exemplary embodiment, the step of receiving the request includes obtaining sensor data as to a measure of wear of one or more brake components of the braking system via one or more sensors of the vehicle, receiving the request via inputs from a user of the vehicle, or both.

Also in an exemplary embodiment, the step of automatically initiating the service of the braking system includes automatically performing a safety check for servicing of the braking system, in accordance with the instructions provided by the processor.

Also in an exemplary embodiment, the step of performing the safety check includes: obtaining sensor data, via one or more sensors of the vehicle, as to a plurality of states of the vehicle; determining, via the processor, whether the vehicle is ready for the service of the braking system, based on the plurality of states of the vehicle as reflected in the sensor data; and providing directions from the processor to a user as to any additional actions required from the user in order to make the vehicle ready for the service of the braking system.

Also in an exemplary embodiment, the method further includes electronically moving one or more braking components of the braking system, in accordance with the instructions provided by the processor, to facilitate the service of the braking system.

Also in an exemplary embodiment, the method further includes obtaining user inputs as to one or more selected wheels for the service of the braking system; wherein the electronic movement of the one or more braking components is performed with respect to a portion of the braking system relating to the one or more selected wheels.

Also in an exemplary embodiment, the method further includes: subsequent to the electronic movement of the one or more braking components, providing directions, via the processor, for a user of the vehicle with guidance for the user to take one or more additional steps associated with the service of the braking system.

Also in an exemplary embodiment, the step of electronically moving one or more braking components of the braking system includes automatically retracting one or more calipers of the braking system, in accordance with the instructions provided by the processor, to facilitate the service of the braking system; and the step of providing the directions includes providing the directions, via the processor, for removal of a brake pad, a brake rotor, or both, of the braking system.

Also in an exemplary embodiment, the method further includes: subsequent to completion of the service of the braking system, selecting, via the processor, a route of travel for the vehicle that optimizes break-in for the braking system following the service thereof.

In another exemplary embodiment, a system is provided that includes one or more sensors and a processor. The one or more sensors are configured to at least facilitate obtaining sensor data as to a vehicle. The processor is coupled to the one or more sensors, and is configured to at least facilitate receiving a request for service of a braking system of the vehicle; and upon receiving the request, automatically initiating the service of the braking system of the vehicle using the sensor data, in accordance with instructions provided by the processor.

Also in an exemplary embodiment, the request for the service is based on an amount of wear of one or more brake components of the braking system as reflected in the sensor data, inputs from a user of the vehicle, or both.

Also in an exemplary embodiment, the processor is further configured to at least facilitate automatically performing a safety check for servicing of the braking system.

Also in an exemplary embodiment, the sensor data pertains to a plurality of states of the vehicle; and the processor is further configured to at least facilitate determining whether the vehicle is ready for the service of the braking system, based on the plurality of states of the vehicle as reflected in the sensor data; and providing directions to the user as to any additional actions required from the user in order to make the vehicle ready for the service of the braking system.

Also in an exemplary embodiment, the processor is further configured to at least facilitate electronically moving one or more braking components of the braking system, in accordance with the instructions provided by the processor, to facilitate the service of the braking system.

Also in an exemplary embodiment, the one or more sensors are further configured to at least facilitate obtaining user inputs as to one or more selected wheels for the service of the braking system; and the processor is further configured to at least facilitate performing the electronic movement of the one or more braking components with respect to a portion of the braking system relating to the one or more selected wheels.

Also in an exemplary embodiment, the processor is further configured to at least facilitate: subsequent to the electronic movement of the one or more braking components, providing directions for the user of the vehicle with guidance for the user to take one or more additional steps associated with the service of the braking system.

Also in an exemplary embodiment, the processor is further configured to at least facilitate retracting one or more calipers of the braking system, in accordance with the instructions provided by the processor, to facilitate the service of the braking system; and providing the directions for removal of a brake pad, a brake rotor, or both, of the braking system.

Also in an exemplary embodiment, the processor is further configured to at least facilitate: subsequent to completion of the service of the braking system, selecting a route of travel for the vehicle that optimizes break-in for the braking system following the service thereof.

In another exemplary embodiment, a vehicle is provided that includes a braking system and a control system. The control system includes one or more sensors and a processor. The one or more sensors are configured to at least facilitate obtaining sensor data as to the vehicle. The processor is coupled to the one or more sensors, and is configured to at least facilitate receiving a request for service of the braking system; and upon receiving the request, automatically initiating the service of the braking system of the vehicle using the sensor data, in accordance with instructions provided by the processor.

Also in an exemplary embodiment, the processor is further configured to at least facilitate automatically performing a safety check for servicing of the braking system, in accordance with the instructions provided by the processor; electronically moving one or more braking components of the braking system, in accordance with the instructions provided by the processor, to facilitate the service of the braking system; and subsequent to the electronic movement of the one or more braking components, providing directions for a user of the vehicle with guidance for the user to take one or more additional steps associated with the service of the braking system.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
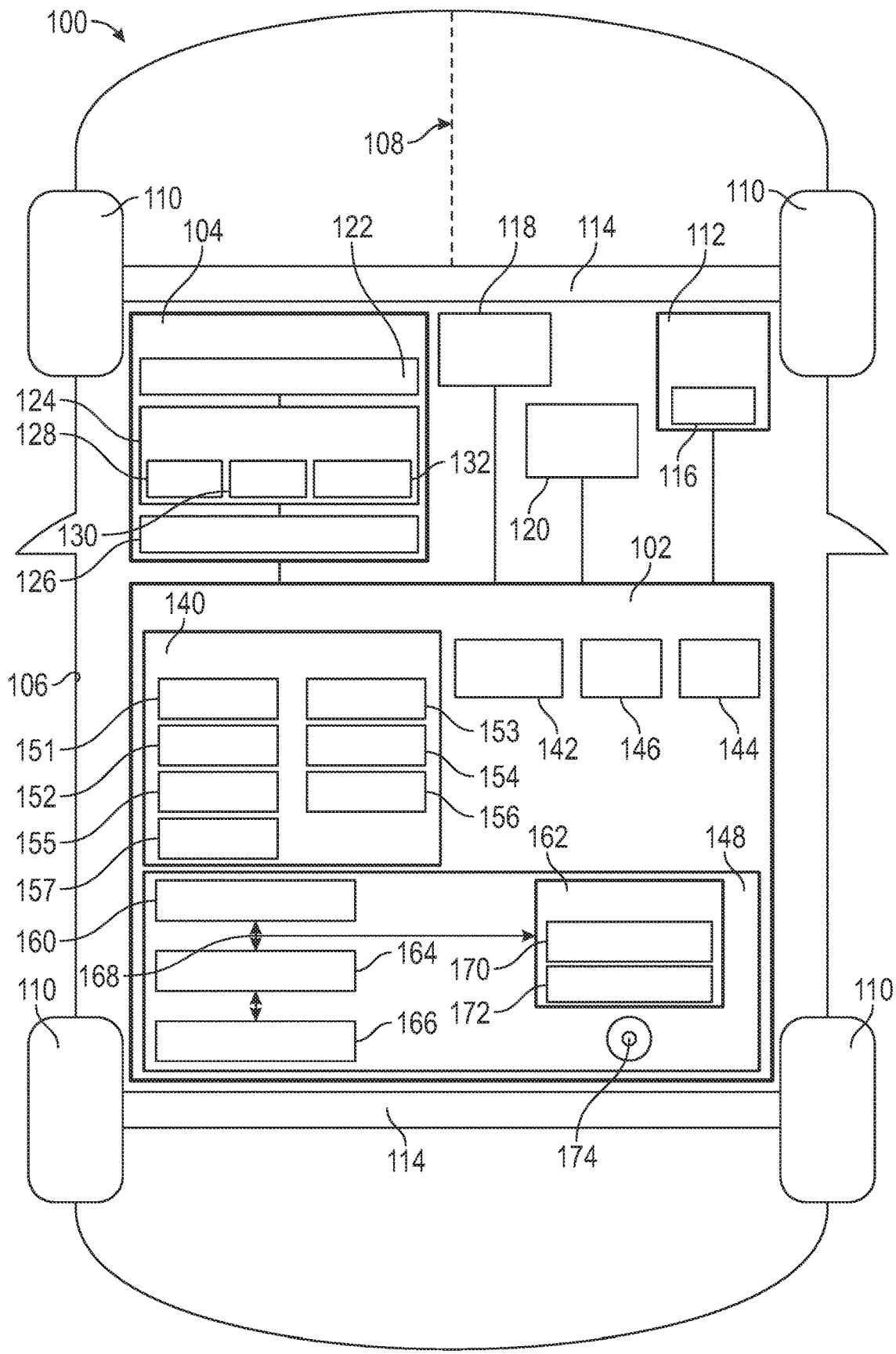
FIG. 1 is a functional block diagram of a vehicle that includes a braking system and a control system for providing brake service management for a user of the vehicle, in accordance with exemplary embodiments.

FIG. 1 illustrates a vehicle 100, according to an exemplary embodiment. As described in greater detail further below, the vehicle 100 includes a control system 102 for controlling service management for the braking system 104, among various other components. As described in greater detail further below, the control system 102 provides a user with the opportunity to perform service on the braking system 104, with assistance and guidance from the control system 102.

In various embodiments, the vehicle 100 includes an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

The vehicle 100 includes a body 106 that is arranged on a chassis 108. The body 106 substantially encloses other components of the vehicle 100. The body 106 and the chassis 108 may jointly form a frame. The vehicle 100 also includes a plurality of wheels 110. The wheels 110 are each rotationally coupled to the chassis 108 near a respective corner of the body 106 to facilitate movement of the vehicle 100. In one embodiment, the vehicle 100 includes four wheels 110, although this may vary in other embodiments (for example for trucks and certain other vehicles).

A drive system 112 is mounted on the chassis 108, and drives the wheels 110, for example via axles 114. In certain embodiments, the drive system 112 comprises a propulsion system. In certain exemplary embodiments, the drive system 112 includes a motor 116 (e.g., an internal combustion engine and/or an electric motor/generator, coupled with a transmission thereof). In certain embodiments, the drive system 112 includes or is coupled to an accelerator pedal that receives inputs from a driver of the vehicle 100. In certain embodiments, the drive system 112 is automatically controlled via the control system 102 (e.g., for an autonomous vehicle).

As depicted in FIG. 1, the vehicle also includes a steering system 118 in various embodiments. In various embodiments, the steering system 118 controls steering of the vehicle 100 via steering components, either based on steering inputs from a user (e.g., via a steering wheel) and/or via automatic control via the control system 102 (e.g., for an autonomous vehicle).

Also in various embodiments, the vehicle 100 may also include any number of other systems 120. These may include, by way of example, lighting control systems, climate control systems, and infotainment systems, among various other possible systems. In certain embodiments, these other systems 120 may also be controlled in whole or in part by the control system 102.

As depicted in FIG. 1, in various embodiments the braking system 104 includes a brake pedal 122, a caliper assembly 124, and a plurality of rotors 126. In certain embodiments, the brake pedal 122 obtains inputs from a user (i.e., driver) of the vehicle 100 for braking. In other embodiments, the braking may also be performed via automatic control via the control system 102 (e.g., for an autonomous vehicle), in which case the brake pedal 122 may not be necessary. In various embodiments, the braking system 104 comprises a brake-by-wire braking system 104. However, this may vary in certain embodiments.

Also as depicted in FIG. 1, in various embodiments the caliper assembly 124 includes a plurality of pads 128, one or more motors 130, and a plurality of pistons 132. In various embodiments, the one or more motors 130 are configured to move the pistons 132 between different positions, to thereby facilitate contact between the pads 128 and the rotors 126 for braking of the vehicle 100 via the braking system 104. In addition, in certain embodiments, the one or more motors 130 are configured to move the pistons 132 between different positions during servicing of the braking system 104, such as retracting the pistons 132 when the pads 128 and/or rotors 126 are replaced. In certain embodiments the caliper assembly 124 includes a single motor 130. However, in other embodiments, the caliper assembly 124 may include multiple motors 130.

With continued reference to FIG. 1, in various embodiments the control system 102 controls braking of the braking system 104, as well as controlling service management for the braking system 104 for a user of the vehicle 100. In various embodiments, the control system 102 controls the service management of the braking system 104 in accordance with the steps of the process 200 as provided in FIG. 2 and as described in greater detail further below. In addition, in various embodiments, the control system 102 may also control, in whole or in part, various other components of the vehicle 100, such as the drive system 112, the steering system 118, and/or other systems 120 of the vehicle 100.

As depicted in FIG. 1, in various embodiments, the control system 102 includes a sensor array 140 and a controller 148. In addition, also as depicted in FIG. 1, in various embodiments the control system 102 may also include a display, a navigation system, and/or a transceiver 144, among other possible components.

In various embodiments, the sensor array 140 includes various sensors that collect data for facilitating service management for the braking system 104, among other functionality for the vehicle 100. As depicted in FIG. 1, in various embodiments, the sensor array 140 includes one or more input sensors 151, drive sensors 152, wear sensors 153, cameras 154, height sensors 155, incline sensors 156, and/or one or more other sensors 157.

In various embodiments, the input sensors 151 receive inputs from a user of a the vehicle 100 (e.g., a driver or other user of the vehicle 100). In various embodiments, the inputs include requests and/or responses from the user as part of the service management of the braking system 104, for example as described in greater detail further below in connection with the process 200 of FIG. 2.

In various embodiments, the drive sensors 152 obtain sensor data from or relating to the drive system 112, such as a status of the motor 116 (e.g., whether it is turned off or on) as well as a current transmission gear for the vehicle 100 (e.g., park, reverse, neutral, drive, low gear), and so on.

In various embodiments, the wear sensors 153 obtain sensor data as to a measure of wear of one or more components of the braking system 104, such as the pads 128 and/or rotors 126 of the braking system 104.

In various embodiments, the cameras 154 obtain camera sensor data as to a position of the vehicle 100, the braking system 104, components thereof, and/or other components of the vehicle 100 during service management of the braking system 104.

In various embodiments, the height sensors 155 obtain sensor data as to a height of the vehicle 100 during service management of the braking system 104. In certain embodiments, the height sensors 155 comprise ride height sensors (e.g., of a suspension system of the vehicle 100).

In various embodiments, the incline sensors 156 obtain sensor data as to an incline of the vehicle 100 during service management of the braking system 104. In certain embodiments, the incline sensors 156 comprise one or more gyro-based sensors; however, in other embodiments one or more other types of incline sensors 156 may be utilized.

In various embodiments, the other sensors 157 may include on or more other sensors that may be utilized during service management of the braking system 104, for example such as speed sensors, accelerometers, weight sensors, or the like.

In various embodiments, the display 142 provides information from the control system 102 for a user of the vehicle 100 (e.g., in certain embodiments, for a driver or other user inside the vehicle 100), in accordance with instructions provided by the control system 102 (e.g., the processor 160 described further below). In certain embodiments, the display 142 includes visual information, such as via a display screen inside the vehicle 100. Also in certain embodiments, the display 142 may also include an audio component, such as via one or more speakers of the vehicle 100. In various embodiments, the display 142 provides information for the user as to the braking system 104, including questions, safety checks, and steps pertaining to the service management for the braking system 104. Also in certain embodiments, the display 142 is also utilized to receive information from the user as to the service management for the braking system 104 (e.g., in combination with the input sensors 151 in certain embodiments).

In certain embodiments, the transceiver 144 provides for or facilitates communication between the control system 102 and a user of the vehicle 100 (e.g., in certain embodiments, for a driver or other user that may be inside or outside the vehicle 100). In certain embodiments, the transceiver 144 transmits messages to an electronic device (e.g., a smart phone, computer, laptop, smart wearable device, or the like) of the user pertaining to the braking system 104, including questions, safety checks, and steps pertaining to the service management for the braking system 104. Also in certain embodiments, the transceiver 144 also receives messages from the electronic device of the user as to the service management for the braking system 104. Accordingly, it will be understood that in various embodiments communications between the control system 102 and the user may occur via the display 142, the transceiver, or both.

In various embodiments, the navigation system 146 obtains location information for the vehicle 100 and for operation of the vehicle 100 and for planning and implementing a path of travel for the vehicle 100. In certain embodiments, the navigation system 146 comprises a satellite-based navigation system, such as a global positioning system (GPS). Also in certain embodiments, the navigation system 146 obtains information for planning a route of travel for the vehicle 100 that optimizes break-in of the braking system 104 after servicing thereof, among other possible functionality.

In various embodiments, the controller 148 is coupled to the sensor array 140 and receives sensor data therefrom. In various embodiments, the controller 148 is further coupled to one or more of (and, in certain embodiments, to each of) the display 142, the transceiver 144, and the navigation system 146, and/or other vehicle components. In various embodiments, the controller 148 controls the braking system 104 and the service management thereof (among various other functions in various embodiments), including as described further below in connection with the process 200 of FIG. 2.

In various embodiments, the controller 148 comprises a computer system (also referred to herein as computer system 148), and includes a processor 160, a memory 162, an interface 164, a storage device 166, and a computer bus 168. In various embodiments, the controller (or computer system) 148 controls vehicle operation, including controlling automated vehicle functionality, among other vehicle control functions. In various embodiments, the controller 148 provides these and other functions in accordance with the steps of the process 200 of FIG. 2, including in connection with performing the service management of the braking system 104 of the vehicle 100 for the vehicle 100.

In various embodiments, the controller 148 (and, in certain embodiments, the control system 102 itself) is disposed within the body 106 of the vehicle 100. In one embodiment, the control system 102 is mounted on the chassis 108. In certain embodiments, the controller 148 and/or control system 102 and/or one or more components thereof may be disposed outside the body 106, for example on a remote server, in the cloud, or other device where image processing is performed remotely.

It will be appreciated that the controller 148 may otherwise differ from the embodiment depicted in FIG. 1. For example, the controller 148 may be coupled to or may otherwise utilize one or more remote computer systems and/or other control systems, for example as part of one or more of the above-identified vehicle 100 devices and systems.

In the depicted embodiment, the computer system of the controller 148 includes a processor 160, a memory 162, an interface 164, a storage device 166, and a bus 168. The processor 160 performs the computation and control functions of the controller 148, and may comprise any type of processor or multiple processors, single integrated circuits such as a microprocessor, or any suitable number of integrated circuit devices and/or circuit boards working in cooperation to accomplish the functions of a processing unit. During operation, the processor 160 executes one or more programs 170 contained within the memory 162 and, as such, controls the general operation of the controller 148 and the computer system of the controller 148, generally in executing the processes described herein, such as the process 200 of FIG. 2 and described further below in connection therewith.

The memory 162 can be any type of suitable memory, including various types of non-transitory computer readable storage medium. In certain examples, the memory 162 is located on and/or co-located on the same computer chip as the processor 160. In the depicted embodiment, the memory 162 stores the above-referenced program 170 along with stored values 172 (e.g., look-up tables, thresholds, map data, and/or other values with respect to service management for the braking system 104 of the vehicle 100).

The interface 164 allows communication to the computer system of the controller 148, for example from a system driver and/or another computer system, and can be implemented using any suitable method and apparatus. In one embodiment, the interface 164 obtains the various data from the sensor array 140, among other possible data sources. The interface 164 can include one or more network interfaces to communicate with other systems or components. The interface 164 may also include one or more network interfaces to communicate with technicians, and/or one or more storage interfaces to connect to storage apparatuses, such as the storage device 166.

The storage device 166 can be any suitable type of storage apparatus, including various different types of direct access storage and/or other memory devices. In one exemplary embodiment, the storage device 166 comprises a program product from which memory 162 can receive a program 170 that executes one or more embodiments of one or more processes of the present disclosure, such as the steps of the process 200 of FIG. 2 and described further below in connection therewith. In another exemplary embodiment, the program product may be directly stored in and/or otherwise accessed by the memory 162 and/or a disk (e.g., disk 174), such as that referenced below.

The bus 168 serves to transmit programs, data, status and other information or signals between the various components of the computer system of the controller 148. The bus 168 can be any suitable physical or logical means of connecting computer systems and components. This includes, but is not limited to, direct hard-wired connections, fiber optics, infrared and wireless bus technologies. During operation, the program 170 is stored in the memory 162 and executed by the processor 160.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 160) to perform and execute the program.

Figure 2:
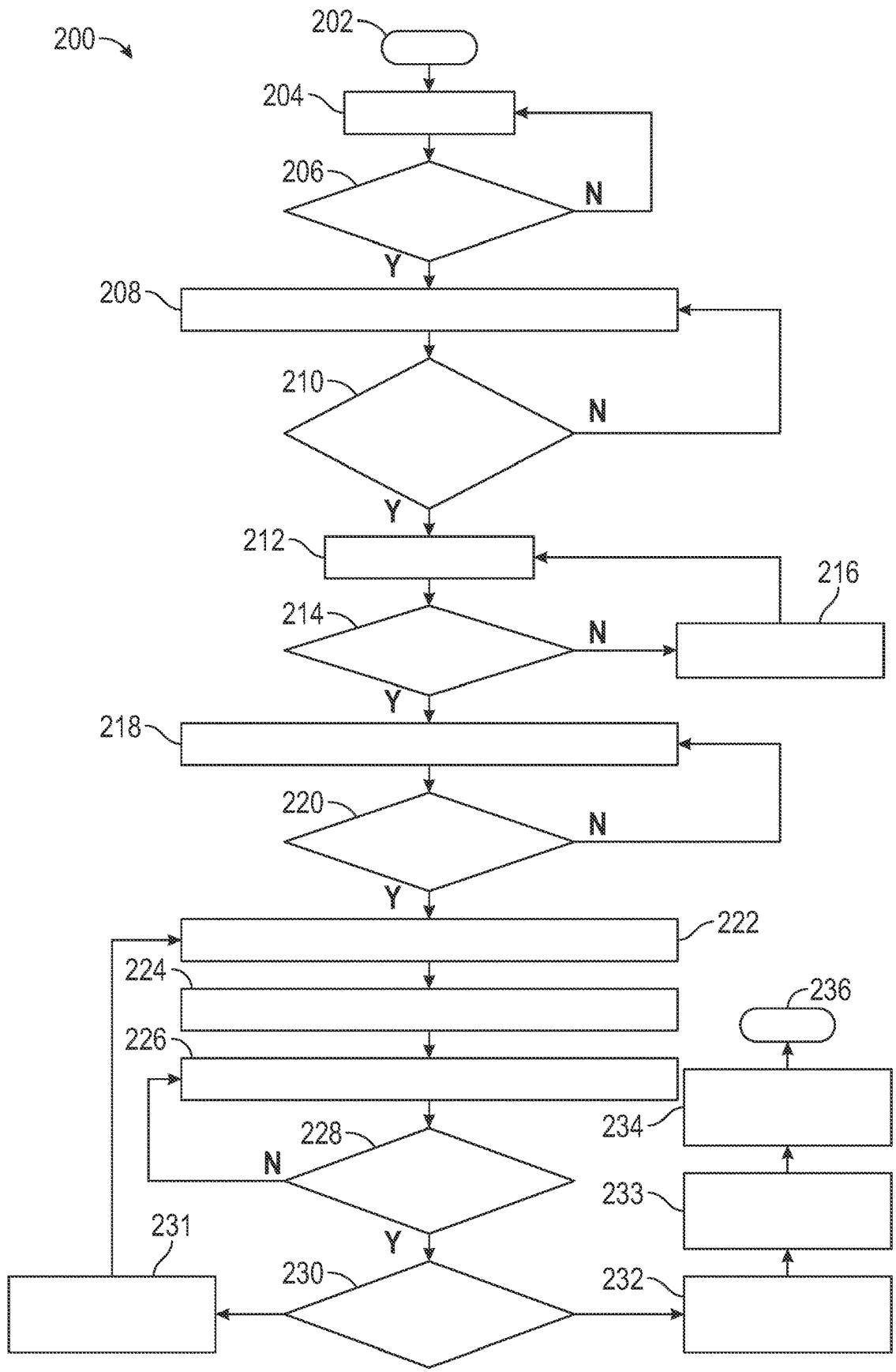
FIG. 2 is a flowchart of process for providing brake service management for a user of a vehicle, and that can be implemented in connection with the vehicle of FIG. 1, including the braking system, control system, and components thereof, in accordance with exemplary embodiments.

FIG. 2 is a flowchart of process 200 for controlling service management for a braking system for a vehicle, in accordance with exemplary embodiments. In various embodiments, the process 200 can be implemented in connection with the vehicle 100 of FIG. 1, including the control system 102, the braking system 104, and other components thereof;

As depicted in FIG. 2, the process 200 begins at step 202. In one embodiment, the process 200 begins when the vehicle 100 is or has been operated, for example during or after a current vehicle drive. In certain embodiments, the process 200 may also begin when a request (e.g., a notification) has been received pertaining to the vehicle 100, and particularly pertaining to the braking system 104 of the vehicle 100 (e.g., pertaining to a desire or need to service the braking system 104 of the vehicle 100). In various embodiments, the request may be obtained from the sensor array 140 of FIG. 1 (e.g., from the wear sensors 153 thereof, including as to a need for service based on at least a predetermined amount of wear on one or more components of the braking system 104), and/or from a user or other party (e.g., a specific request for service, such as via the input sensors 151, the transceiver 144, and/or the display 142). In one embodiment, the steps of the process 200 are performed continuously once the process 200 begins.

Sensor data is obtained at step 204. In various embodiments, sensor data pertaining to the vehicle is obtained via each of the sensors of the vehicle's sensor array 140 of FIG. 1. In certain embodiments, the sensor data of step 204 includes sensor information as to inputs form a user (e.g., via the input sensors 151); status of the drive system 112, such as whether the motor 116 is turned off or on and a transmission gear for the drive system 112 (e.g., via the drive sensors 152); measures of wear of one or more braking system 104 components, such as the pads 128 and/or the rotors 126 (e.g., via the wear sensors 153); camera data as to a current placement and positioning of the vehicle 100 (e.g., via the cameras 154); a height, such as a ride height, of the vehicle 100 (e.g., via the height sensors 155); an incline of the vehicle 100 (e.g., via the incline sensors 156), and so on. Also in various embodiments, additional information may also be obtained, such as from the transceiver 144 (e.g., including messages and inputs from the user as to service management for the braking system 104), and/or from the navigation system 146 (e.g., as to a current geographic location of the vehicle 100 and potential routes to break-n the braking system 104 after servicing, and so on).

In various embodiments, a determination is made as to whether a braking system request (e.g., notification) has been received (step 206). In various embodiments, this determination is made by the processor 160 based on the sensor data and/or other information (e.g., communications) of step 204. For example, in certain embodiments, during step 206, a braking system notification (or request) would be characterized as received when wear sensors 153 of FIG. 1 provide sensor data indicating that one or more components of the braking system 104 (such as the pads 128 and/or rotors 126) have experienced a sufficient amount of wear such that replacement is required. By way of example, also in certain embodiments, a braking system notification (or request) would also be characterized as received when the control system 102 received inputs from a user or other third party (e.g., via the input sensors 151 and/or the transceiver 144 of FIG. 1) that servicing of the braking system 104 is desired and/or required.

In various embodiments, if it is determined in step 206 that a brake notification (e.g., request) has not been received, then the process returns to step 204, and steps 204-206 thereafter continue until a determination is made during an iteration of step 206 that a brake notification has been received. Also in various embodiments, once it is determined in an iteration of step 206 that a brake notification (e.g., request) has been received, the process proceeds to step 208, described directly below.

In various embodiments, during step 208, braking system management service is offered. Specifically, in certain embodiments, the control system 102 provides a notification to the user (e.g., either via the display 142 inside the vehicle, or via an electronic message sent via the transceiver 144 to an electronic device of the user, or both) that offers the braking system management service, and that seeks a response from the user confirming whether the user desires to utilize the braking system management service.

In various embodiments, a determination is made as to whether a management system has been entered for the braking system (step 210). In various embodiments, a processor (such as the processor 160 of FIG. 1) determines whether the user has provided inputs (e.g., via the display 142 of the vehicle 100 and/or via an electronic device of the user as received via the transceiver 144) indicating that the user desires to utilize the management system for service of the braking system 104.

In various embodiments, if it is determined in step 210 that a management system has not been entered (e.g., if the user has not provided inputs for implementation of the management service for service of the braking system 104), then the process returns to step 208, and steps 208-210 thereafter repeat until a determination is made in an iteration of step 210 that a management system has been entered. Also in various embodiments, once it is determined in an iteration of step 210 that a management system has been entered (e.g., when the user has provided inputs for implementation of the management service for service of the braking system 104), then the process proceeds to step 212, described below.

In various embodiments, during step 212, safety checks are performed. In various embodiments, the safety checks are performed via the processor 160 of FIG. 1 using information obtained via the sensors of the sensor array 140, and in certain embodiments also using information obtained via user inputs (e.g., via the transceiver 144, the display 142, and/or the input sensors 151 of FIG. 1). In certain embodiments, the safety checks include the following, among other possible safety checks: (i) hoist status of the vehicle 100; (ii) whether chocks are used on both side of the wheels 110; (iii) a status of the drive system 112 (e.g., whether the vehicle 100 is in a park transmission gear); (iv) whether the motor 116 of the vehicle 100 is turned off; and (v) whether an incline of the vehicle 100 as within an acceptable range (e.g., such that the incline does not exceed a predetermined value as stored in the memory 162 as one of the stored values 172 therein).

In various embodiments, these values are obtained via the sensor array 140 of FIG. 1, such as via the ride height sensors 155 (e.g., as to the hoist status), the cameras 154 (e.g., as to the hoist status, use of chocks, and/or other parameters), incline sensors 156 (e.g., as to the incline of the vehicle 100), drive sensors 152 (e.g., as to the transmission gear and whether the motor 116 is off), among other possible sensors, and/or via the input sensors 151, display 142, and/or transceiver 144 (e.g., as to user inputs as to whether the vehicle 100 is prepared for servicing of the braking system 104, and/or as to inputs as to one or more other parameters, such as to whether the vehicle 100 is hoisted, chocks are utilized, the motor 116 is turned off, the vehicle 100 is in the park transmission gear, and so on).

In various embodiments, a determination is made as to whether the vehicle 100 is ready for service of the braking system 104 (step 214). In various embodiments, this determination is made by the processor 160 of FIG. 1 based on the safety checks of step 212. Specifically, in various embodiments, the vehicle 100 is determined to be ready for service of the braking system 104 when all of the following conditions are satisfied, namely: (i) the vehicle 100 is properly hoisted; (ii) chocks are used on both sides of the wheels 110; (iii) the vehicle 100 is in park; (iv) the motor 116 of the vehicle 100 is turned off; and (v) the incline of the vehicle 100 as within an acceptable range.

In various embodiments, if it is determined in step 214 that the vehicle 100 is not ready for service of the braking system 104, then one or more actions are performed (step 216). In various embodiments, the actions of step 216 comprise notifications and instructions to the user of the vehicle 100 (e.g., to an owner of the vehicle 100, an individual servicing the vehicle 100, or the like) to perform certain steps in order so that the vehicle 100 will then be ready for service of the braking system 104. For example, in various embodiments, the processor 160 of FIG. 1 may provide instructions for such notifications and instructions via the display 142 and/or via the transceiver 144 (e.g., via communications sent to an electronic device of the user) for the user to perform any needed steps that have not yet been performed prior to service of the braking system 104, such as: (i) hoisting the vehicle; (ii) placing chocks on both sides of the wheels 110; (iii) placing the vehicle 100 into a park transmission gear; (iv) turning off the motor 116; (v) adjusting an incline of the vehicle 100, and so on. In certain embodiments, such corrective actions may also be performed automatically via instructions provided by the processor 160 to one or more other vehicle components (e.g., such as turning off the motor 116, turning the drive system 112 to a park gear or mode, and so on).

In various embodiments, once the actions are taken in step 216, the process then returns to step 212 for follow-up safety checks, and then to step 214 for a subsequent determination as to whether the vehicle 100 is ready for service of the braking system 104. In various embodiments, steps 212-216 repeat in this manner until a determination is made during an iteration of step 214 that the vehicle 100 is ready for service of the braking system 104.

In various embodiments, once it is determined in an iteration of step 214 that the vehicle 100 is ready for service of the braking system 104, choices are offered for the user as to desired corners and/or axles for service of the braking system 104 (step 218). Specifically, in various embodiments, the user is presented with options as to which of the wheels 110 are desired for brake service. For example, in various embodiments, the user may choose for service of the braking system 104 with respect to a front axle 114, a rear axle 114, or both, or with respect to which corner wheels 110 (e.g., front driver side, front passenger side, rear driver side, and/or rear passenger side wheels 110, and so on) brake service is desired.

In various embodiments, a determination is made as to whether a user selection has been made (step 220). Specifically, in various embodiments, the processor 160 determines whether the user has made a selection in response to the choices offered during step 218, such as through user inputs via the display 142, input sensors 151, and/or transceiver 144 (e.g., either via direct interface with the vehicle 100 and/or through messages sent via an electronic device of the user).

In various embodiments, if it is determined in step 220 that the user has not made a selection, then the process returns to step 218. In various embodiments, steps 218 and 220 then repeat in various iterations until a determination is made during an iteration of step 220 that a user selection has been made. In various embodiments, once a determination is made during an iteration of step 220 that a user selection has been made, the process proceeds to step 222, described below.

In various embodiments, during step 222, an identification is made as to a first corner for the brake service (step 222). In various embodiments, this identification is made by the processor 160 of FIG. 1 based on the user selection as determined in step 220. In various embodiments, the identification of step 222 comprises a particular wheel 110 of the vehicle 100 for initiation of the brake service.

In various embodiments, one or more initial service actions are initiated (step 224). Specifically, in certain embodiments, the processor 160 provides instructions for one or more steps to be automatically performed to initiate the brake service for the selected wheel 110 (or corner) of the vehicle 100. In various embodiments in which the service includes replacement of brake pads 128, the processor 160 provides instructions for the motor 130 to automatically move respective piston(s) 132 away from the brake pad(s) 128, such as by automatically and electronically retracting the piston(s) 132 so as to facilitate removal to the brake pad(s) 128. In various embodiments, these instructions are then automatically carried out by the motor 130. In certain embodiments, the instructions (and implementation thereof) may also include the movement of the piston(s) 132 and/or the caliper assembly 124 to facilitate removal of the brake rotors 126, and so on.

In various embodiments, once the initial service actions of step 224 are performed, follow-up communications are provided for the user (step 226). Specifically, in various embodiments, information and directions are then provided to the user with instructions for the next step in servicing the braking system 104 for the particular wheel 110 (e.g., corner) of the vehicle 100 that is currently being worked on. For example, in certain embodiments, the user is instructed to replace the brake pad(s) 128 (e.g., now that the piston(s) have been successfully retracted out of the way) for the particular wheel 110 (or corner) of the vehicle 100. In certain embodiments, the user may be instructed to take one or more other service actions, such as replacing the brake rotor(s) 126 for the particular wheel 110 (or corner) of the vehicle 100.

In various embodiments, a determination is made as to whether the service is complete for the particular wheel 110 (or corner) (step 228). Specifically, in certain embodiments, a determination is made by the processor 160 of FIG. 1 as to the requested action(s) (such as the replacement of the brake pad(s) 128 and/or rotor(s) 126) with respect to the particular wheel 110 being worked on. In certain embodiments, this determination may be made via one or more prompts made to the user and corresponding inputs received from the user (e.g., confirming that the actions have been taken). In certain embodiments, sensor data may also be used (e.g., via one or more cameras 154 of FIG. 1).

In various embodiments, if it is determined that the service or not complete for the particular wheel, then the process returns to step 226, with further communications with the user as needed. In various embodiments, steps 226 and 228 thereafter repeat in various iterations until a determination is made during an iteration of step 228 that the service is complete for the particular wheel 110 that is being worked on. In various embodiments, once it is determined in an iteration of step 228 that the service is complete for the particular wheel 110 that is being worked on, the process then proceeds to step 230, described below.

In various embodiments, during step 230, a determination is made as to whether the service actions have been performed for each of the wheels 110 that were selected by the user for brake service. In various embodiments, this determination is made by the processor 160 of FIG. 1.

In various embodiments, if it is determined in step 230 that the service actions have not been performed for one or more of the wheels 110 that were selected by the user for brake service, then the process proceeds to step 231. In various embodiments, during step 231, the processor 160 of FIG. 1 identifies a subsequent wheel 110 (or corner) of the vehicle 100 for service. Specifically, in various embodiments, during step 231, the processor 160 selects one of the wheels 110 that was originally selected for brake service by the user (i.e., in steps 218-220), but for which the service has not yet been completed (i.e., in steps 222-228). In various embodiments, the process then proceeds to the above-described step 222, as the service begins on the subsequent identified wheel 110 (or corner) of step 231. In various embodiments, steps 222-231 repeat in this manner in various iterations until a determination is made in an iteration of step 230 that the service actions have been completed for each of the wheels 110 that were selected by the user for brake service.

In various embodiments, once it is determined during an iteration of step 230 that the service actions have been completed for each of the wheels 110 that were selected by the user, the process then proceeds to step 232, as described below.

In various embodiments, during step 232, a post service routine is completed. Specifically, in certain embodiments, during step 232, a post-service safety check is performed, and a brake pad clearance is set to a driving position. In various embodiments, this is performed in accordance with instructions provided by the processor 160 of FIG. 1. In various embodiments, the process then proceeds to step 233, described below.

In various embodiments, during step 233, one or more routes are selected to break in the newly serviced braking system 104. Specifically, in various embodiments, the processor 160 of FIG. 1 selects one or more optimized routes of travel for the vehicle 100 that facilitates optimal break-in of the braking system 104 (e.g., with the newly replaced pads 128 and/or rotors 126). In various embodiments, the processor 160 selects the optimized routes of travel in conjunction with the navigation system 146 of FIG. 1 (and in conjunction with map data stored in the memory 162 of FIG.

1 as stored values 172 therein), including by selected routes of travel based on the routes having a desired range of speed limits and/or a desired number and/or frequency of stop signs, stop lights, and the like, that may be desired in order to provide optimal break-in for longevity and performance of the newly serviced braking system 104.

In certain embodiments, the processor 160 and/or the navigation system 146 may first receive from the user a desired destination of travel for the vehicle 100, and then may subsequently selected an optimized route to reach the destination while also providing the break-in features for the braking system 104. By way of example, instead of selected the route to the destination based on the shortest distance or shortest travel time, the processor 160 may instead select an optimized alternate route to the destination based on the desired range of speed limits and number and/or frequency of stop lights, stop signs, and the like in order to facilitate an optimized break-in for the newly serviced braking system 104.

In various embodiments, the selected routes are implemented (step 234). Specifically, in various embodiments, the one or more optimized break-in routes of step 233 are implemented during step 234. In certain embodiments (for example, in which the vehicle 100 comprises an autonomous vehicle 100), the processor 160 provides instructions to other vehicle components (e.g., the drive system 112, the steering system 118, and the braking system 104) to automatically drive itself along the one or more optimized break-in routes (e.g., via automatic acceleration, steering, braking, and so on as directed by the processor 160). Alternatively, in other embodiments, the processor 160 provides recommendations for the user as to the optimized break-in routes (e.g., via the display 142, via the navigation system 146, and/or via the transceiver 144 to the electronic device of the user) for implementation by the user (e.g., as directed via a map as provided via the navigation system 146, display 142, and/or as transmitted via the transceiver 144 to an electronic device of the user, and so on).

In various embodiments, the process 200 then terminates (step 236).

Accordingly, methods, systems, and vehicles are provided for performing brake service management for a braking system for a vehicle. Specifically, in various embodiments, a control system (including a processor) of the vehicle provides a user (such as an owner of the vehicle or a mechanic that is to perform brake service for the vehicle) is provided an opportunity for facilitated service management for the braking system. For example, in various embodiments, the processor performs various sensor checks based on sensor data and/or communications with the user, and automatically initiates the brake service with one or more initial steps (such as instructing a motor of the caliper to electronically retract the pistons to facilitate replacement of the brake pads and/or brake rotors). Also in various embodiments, the processor also provides directions for the user to perform one or more additional service steps (such as replacement of the brake pads and/or rotors) after the initial steps are performed in accordance with instructions provided by the processor. In addition, in certain embodiments, the processor may also work together with a navigation system of the vehicle in order to plan and, in certain embodiments, implement an optimized break-in route for the vehicle to travel in order to optimize the brake-in for the newly serviced braking system. It is noted that while these techniques may be implemented in connection with a brake-by-wire braking system, various of these techniques may also be implemented in different embodiments via one or more other different types of braking systems.

It will be appreciated that the systems, vehicles, and methods may vary from those depicted in the Figures and described herein. For example, the vehicle 100 of FIG. 1, the control system 102 and braking system 104 thereof, and/or components thereof of FIG. 1 may vary in different embodiments. It will similarly be appreciated that the steps of the process 200 may differ from that depicted in FIG. 2, and/or that various steps of the process 200 may occur concurrently and/or in a different order than that depicted in FIG. 2.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
    receiving a request for service of a braking system of a vehicle; and
    upon receiving the request, automatically initiating the service of the braking system of the vehicle, in accordance with instructions provided by a processor of the vehicle, including by:
        automatically performing a safety check for servicing of the braking system, in accordance with the instructions provided by the processor, including based on whether the vehicle is properly hoisted, chocks are used on both sides of wheels of the vehicle, the vehicle is in park, an engine of the vehicle is turned off, and an incline of the vehicle is within a predetermined range;
        determining, via the processor, when the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range; and
        electronically moving one or more braking components of the braking system, via a motor of the vehicle in accordance with the instructions provided by the processor, to facilitate the service of the braking system via removal of brake pads, brake rotors, or both of the braking system, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

2. The method of claim 1, wherein the step of receiving the request comprises obtaining sensor data as to a measure of wear of one or more brake components of the braking system via one or more sensors of the vehicle, receiving the request via inputs from a user of the vehicle, or both.

3. The method of claim 1, wherein the step of performing the safety check comprises:
  obtaining sensor data, via one or more sensors of the vehicle, as to a plurality of states of the vehicle;
  determining, via the processor, whether the vehicle is ready for the service of the braking system, based on the plurality of states of the vehicle as reflected in the sensor data; and
  providing directions from the processor to a user as to any additional actions required from the user in order to make the vehicle ready for the service of the braking system.

4. The method of claim 1, further comprising:
  obtaining user inputs as to one or more selected wheels for the service of the braking system;
  wherein the electronic movement of the one or more braking components is performed with respect to a portion of the braking system relating to the one or more selected wheels.

5. The method of claim 1, further comprising:
  subsequent to the electronic movement of the one or more braking components, providing directions, via the processor, for a user of the vehicle with guidance for the user to take one or more additional steps associated with the service of the braking system.

6. The method of claim 5, wherein:
  the step of electronically moving one or more braking components of the braking system comprises automatically retracting one or more calipers of the braking system, in accordance with the instructions provided by the processor, to facilitate the service of the braking system; and
  the step of providing the directions comprises providing the directions, via the processor, for removal of a brake pad, a brake rotor, or both, of the braking system.

7. The method of claim 1, further comprising:
  subsequent to completion of the service of the braking system, selecting, via the processor, a route of travel for the vehicle that optimizes break-in for the braking system following the service thereof.

8. A system comprising:
  one or more sensors configured to at least facilitate obtaining sensor data as to a vehicle; and
  a processor that is coupled to the one or more sensors and that is configured to at least facilitate:
    receiving a request for service of a braking system of the vehicle; and
    upon receiving the request, automatically initiating the service of the braking system of the vehicle using the sensor data, in accordance with instructions provided by the processor, including by:
      automatically performing a safety check for servicing of the braking system, in accordance with the instructions provided by the processor, including based on whether the vehicle is properly hoisted, chocks are used on both sides of wheels of the vehicle, the vehicle is in park, an engine of the vehicle is turned off, and an incline of the vehicle is within a predetermined range;
      determining when the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range; and
      electronically moving one or more braking components of the braking system, via a motor of the vehicle in accordance with the instructions provided by the processor, to facilitate the service of the braking system via removal of brake pads, brake rotors, or both of the braking system, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

9. The system of claim 8, wherein the request for the service is based on an amount of wear of one or more brake components of the braking system as reflected in the sensor data, inputs from a user of the vehicle, or both.

10. The system of claim 8, wherein:
  the sensor data pertains to a plurality of states of the vehicle; and
  the processor is further configured to at least facilitate:
    determining whether the vehicle is ready for the service of the braking system, based on the plurality of states of the vehicle as reflected in the sensor data; and
    providing directions to the user as to any additional actions required from a user in order to make the vehicle ready for the service of the braking system.

11. The system of claim 8, wherein:
  the one or more sensors are further configured to at least facilitate obtaining user inputs as to one or more selected wheels for the service of the braking system; and
  the processor is further configured to at least facilitate performing the electronic movement of the one or more braking components with respect to a portion of the braking system relating to the one or more selected wheels.

12. The system of claim 8, wherein the processor is further configured to at least facilitate:
  subsequent to the electronic movement of the one or more braking components, providing directions for a user of the vehicle with guidance for the user to take one or more additional steps associated with the service of the braking system.

13. The system of claim 12, wherein the processor is further configured to at least facilitate:
  retracting one or more calipers of the braking system, in accordance with the instructions provided by the processor, to facilitate the service of the braking system; and
  providing the directions for removal of a brake pad, a brake rotor, or both, of the braking system.

14. The system of claim 8, wherein the processor is further configured to at least facilitate:
  subsequent to completion of the service of the braking system, selecting a route of travel for the vehicle that optimizes break-in for the braking system following the service thereof.

15. A vehicle comprising:
  a braking system; and
  a control system comprising:
    one or more sensors configured to at least facilitate obtaining sensor data as to the vehicle; and
    a processor that is coupled to the one or more sensors and that is configured to at least facilitate:
      receiving a request for service of the braking system; and upon receiving the request, automatically initiating the service of the braking system of the vehicle using the sensor data, in accordance with instructions provided by the processor, including by:

automatically performing a safety check for servicing of the braking system, in accordance with the instructions provided by the processor, including based on whether the vehicle is properly hoisted, chocks are used on both sides of wheels of the vehicle, the vehicle is in park, an engine of the vehicle is turned off, and an incline of the vehicle is within a predetermined range;

determining, via the processor, when the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range; and electronically moving one or more braking components of the braking system, via a motor of the vehicle in accordance with the instructions provided by the processor, to facilitate the service of the braking system via removal of brake pads, brake rotors, or both of the braking system, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

16. The vehicle of claim 15, wherein the processor is further configured to at least facilitate:

subsequent to the electronic movement of the one or more braking components, providing directions for a user of the vehicle with guidance for the user to take one or more additional steps associated with the service of the braking system.

17. The method of claim 1, further comprising:

automatically and electronically retracting pistons of the vehicle away from respective brake pads of the vehicle, facilitating removal of the brake pads, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

18. The method of claim 17, further comprising:

automatically and electronically moving a caliper assembly of the vehicle away from respective brake rotors of the vehicle, facilitating removal of the brake rotors, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

19. The system of claim 8, wherein the processor is further configured to at least facilitate:

automatically and electronically retracting pistons of the vehicle away from respective brake pads of the vehicle, facilitating removal of the brake pads, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range; and automatically and electronically moving a caliper assembly of the vehicle away from respective brake rotors of the vehicle, facilitating removal of the brake rotors, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

20. The vehicle of claim 15, wherein the processor is further configured to at least facilitate:

automatically and electronically retracting pistons of the vehicle away from respective brake pads of the vehicle, facilitating removal of the brake pads, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range; and automatically and electronically moving a caliper assembly of the vehicle away from respective brake rotors of the vehicle, facilitating removal of the brake rotors, via the motor of the vehicle in accordance with the instructions provided by the processor, when it is determined by the processor that the vehicle is ready for service, based on the safety check, including based on whether the vehicle is properly hoisted, chocks are used on both sides of the wheels of the vehicle, the vehicle is in park, the engine of the vehicle is turned off, and the incline of the vehicle is within the predetermined range.

* * * * *